(12) United States Patent
Lampinen (10) Patent No.: US 10,476,295 B2
(45) Date of Patent: Nov. 12, 2019

(54) CHARGING OPTIMIZATION (71) Applicant: Microsoft Technology Licensing, LLC, Redmond, WA (US)

(72) Inventor: Harri Lampinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 15/243,916

(22) Filed: Aug. 22, 2016

(65) Prior Publication Data

US 2018/0054080 A1    Feb. 22, 2018

(51) Int. Cl.
*H02J 7/04* (2006.01)
*H02J 7/00* (2006.01)
*H02J 7/02* (2016.01)
*G06F 1/26* (2006.01)
*G06F 1/32* (2019.01)

(52) U.S. Cl.
CPC ........... *H02J 7/045* (2013.01); *G06F 1/26* (2013.01); *H02J 7/0068* (2013.01); *H02J 7/022* (2013.01); *G06F 1/32* (2013.01)

(58) Field of Classification Search
CPC .......... H02J 7/045; H02J 7/0068; H02J 7/022; H02J 7/04; H02J 7/00; H02J 7/02
USPC ........................................................ 320/162
See application file for complete search history.

(56) References Cited

U.S. PATENT DOCUMENTS

| | | | |
|---|---|---|---|
| 5,557,192 A | 9/1996 | Tamai | |
| 5,773,961 A | 6/1998 | Cameron et al. | |
| 5,818,197 A | 10/1998 | Miller et al. | |
| 6,118,254 A | 9/2000 | Faulk | |
| 6,489,750 B2* | 12/2002 | Hebding | H02J 7/0052 320/139 |
| 6,518,733 B1* | 2/2003 | Schenkel | H02M 3/33507 320/166 |
| 7,062,647 B2* | 6/2006 | Nguyen | G06F 1/3203 713/100 |
| 7,453,239 B2 | 11/2008 | Suzuki | |
| 7,602,151 B2 | 10/2009 | Lai et al. | |
| 8,421,416 B2 | 4/2013 | Hsu et al. | |
| 8,450,976 B2* | 5/2013 | Lipcsei | H02J 7/0031 320/134 |

(Continued)

OTHER PUBLICATIONS

"International Search Report and Written Opinion Issued in PCT Application No. PCT/US2017/046889", dated Dec. 4, 2017, 15 Pages.

(Continued)

*Primary Examiner* — Richard Isla
*Assistant Examiner* — Dung V Bui (57) ABSTRACT In an embodiment a device comprises an output port configured to output an output voltage and an output current, a measurement module configured to measure the output current, and a controller configured to set an output voltage at a first level, receive a first measured output current, set an output voltage at a second level receive a second measured output current, compare the first measured output current and the second measured output current, increase the output voltage if the second measured output current is less than the first measured output current, and decrease the output voltage if the second measured output current is the same as or greater than the first measured output current.

20 Claims, 4 Drawing Sheets

(56) References Cited

U.S. PATENT DOCUMENTS

| | | | |
|---|---|---|---|
| 8,629,649 B2 | 1/2014 | Guo et al. | |
| 9,564,772 B2* | 2/2017 | Qiu | H02J 7/022 |
| 2002/0099962 A1* | 7/2002 | Nakamura | G06F 1/3203 |
| | | | 713/300 |
| 2003/0226048 A1 | 12/2003 | Nguyen et al. | |
| 2005/0017676 A1* | 1/2005 | Takimoto | H02J 7/0031 |
| | | | 320/107 |
| 2007/0188139 A1* | 8/2007 | Hussain | H02J 7/0073 |
| | | | 320/128 |
| 2008/0136505 A1* | 6/2008 | Valentian | H03K 17/162 |
| | | | 327/543 |
| 2008/0138680 A1* | 6/2008 | Hu | H01M 8/0494 |
| | | | 429/431 |
| 2009/0167239 A1* | 7/2009 | Yano | H01M 8/04552 |
| | | | 320/101 |
| 2009/0184687 A1* | 7/2009 | Schroeder | H01M 10/44 |
| | | | 320/162 |
| 2010/0066311 A1 | 3/2010 | Bao et al. | |
| 2010/0264882 A1* | 10/2010 | Hartular | H01M 10/44 |
| | | | 320/139 |
| 2011/0001460 A1* | 1/2011 | Buthker | H02M 3/1588 |
| | | | 323/283 |
| 2011/0199040 A1* | 8/2011 | English | H02J 7/0073 |
| | | | 320/101 |
| 2012/0049808 A1* | 3/2012 | Nakai | G06F 1/28 |
| | | | 323/234 |
| 2012/0091966 A1* | 4/2012 | Mori | H01M 10/44 |
| | | | 320/134 |
| 2012/0235630 A1* | 9/2012 | Qiu | H02J 7/022 |
| | | | 320/107 |
| 2012/0268063 A1* | 10/2012 | Qiu | H02J 7/022 |
| | | | 320/107 |
| 2013/0257358 A1* | 10/2013 | Hussain | H02J 7/0073 |
| | | | 320/107 |
| 2014/0067233 A1* | 3/2014 | Nishida | F02D 41/20 |
| | | | 701/103 |
| 2014/0184173 A1* | 7/2014 | Szepesi | H02J 7/0068 |
| | | | 320/164 |
| 2015/0137598 A1 | 5/2015 | Hawawini et al. | |
| 2016/0087462 A1* | 3/2016 | Kudo | H02J 7/0068 |
| | | | 320/162 |

OTHER PUBLICATIONS

Chen, et al., "New Digital-Controlled Technique for Battery Charger With Constant Current and Voltage Control Without Current Feedback", In Proceedings of IEEE Transactions on Industrial Electronics vol. 59, Issue 3, Mar. 2012, pp. 1545-1553.

Lampinen, et al., "A new dual-mode data compressing A/D converter", In Proceedings of IEEE International Symposium on Circuits and Systems, vol. 1, Jun. 9, 1997, pp. 429-432.

Lampinen, et al., "Novel Successive-Approximation Algorithms", In Proceedings of IEEE International Symposium on circuits and Systems, May 23, 2005, pp. 188-191.

Triggs, Rob, "Quick Charge 3.0 explained: what you need to know", Published on: Sep. 30, 2015, 3 pages, Available at: http://www.androidauthority.com/quick-charge-3-0-explained-643053.

"Anker",Retrieved on: Mar. 18, 2016, 4 pages, Available at: http://www.amazon.com/s/ref=as_li_ss_tl?tag=androheadl04-20&url=search-alias%3daps&field-keywords=quick+charge+3.0&linkCode=sl2&linkId=b4c0ab9388ad5191434f6f7fc366b48b.

\* cited by examiner

CHARGING OPTIMIZATION

BACKGROUND

Portable electronic devices need a power source to operate. Usually the power source is a battery. For ease of use and keeping the operating cost low, rechargeable batteries may be used. Rechargeable batteries may have multiple charging constraints for proper charging and maintaining a desired performance level. If these constraints are not followed during charging, the batteries may be damaged and/or cause damage to the device and even injure the user in extreme cases. During a charging cycle, the charging current and charging voltage needed by a battery may change. Such devices may comprise a charging circuit for charging the battery, wherein the voltage and/or the current provided to the electronic device is independent of requirements of the charging circuit and/or the battery. This may lead to power dissipation and raise the temperature of the device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A device and a method for increasing the efficiency of a charging circuit are described, wherein the charging circuit may reside inside a portable electronic device. The device controls the voltage and the current supplied to the charging circuit by monitoring the output current to the charging circuit and providing sufficient voltage to the charging circuit.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in context of charging a smartphone, this is only an implementation and not a limitation. As those skilled in the art will appreciate, the present embodiments are suitable for application in a variety of different types of rechargeable devices and charging solutions for them, for example mobile phones, portable music players, laptops, tablet computers, phablets, portable game consoles, personal digital assistants, multimedia players, battery operated power tools, electric vehicles etc.

Portable devices comprising a charging circuit and a battery may involve generation of unwanted heat due to voltage drop across the charging circuit. Voltage may be needed to be dropped by the charging circuit to provide an optimal charging voltage to a battery, which may be lesser than the voltage available at an input of the charging circuit. Unwanted heat generation may be detrimental to performance of the device and may also affect usability of the device as it may become uncomfortably hot to use during charging. Also the power so lost by dropping the voltage may affect efficiency adversely.

According to an embodiment, a voltage may be made available to a charging circuit such that a minimum voltage drop occurs across the charging circuit during the charging cycle, thus reducing unwanted heat generation and possibly improving efficiency. In an embodiment, a device may be configured in between an off the shelf wall adapter and a portable electric device comprising a charging circuit and a battery. The device so configured may provide a voltage to the charging circuit which is a sum of minimum voltage drop across the charging circuit, for example, due to parasitic resistance and the charging voltage needed by the battery. Generation of unwanted heat may be shifted out of the portable electric device comprising the battery and charging circuit. In an embodiment, generation of unwanted heat may be shifted away from temperature sensitive areas of the portable electric device. In yet another embodiment, generation of unwanted heat may be reduced substantially, thereby improving efficiency. Shifting or reducing the generation of unwanted heat may help in keeping temperature of the portable electric device low, improving user experience during charging. Further, lower device temperature may allow higher charging currents, while satisfying permissible temperature limits, thus allowing faster charging.

According to an embodiment, a charging circuit may comprise a linear regulator and the device may be configured in between the charging circuit and a wall adapter. The device may also comprise a switched mode regulator, resulting in low heat generation in the charging circuit and higher efficiency. According to an embodiment, a wall adapter may be provided which provides a voltage equal or substantially equal to a sum of minimum voltage drop across a charging circuit and a charging voltage needed by the battery, which may reduce generation of unwanted heat in the charging circuit. According to an embodiment, wherein the device is implemented inside the portable electric device, generation of unwanted heat in a device due to charging may be shifted from sensitive areas to non-sensitive areas of the portable electric device.

Figure 1A:
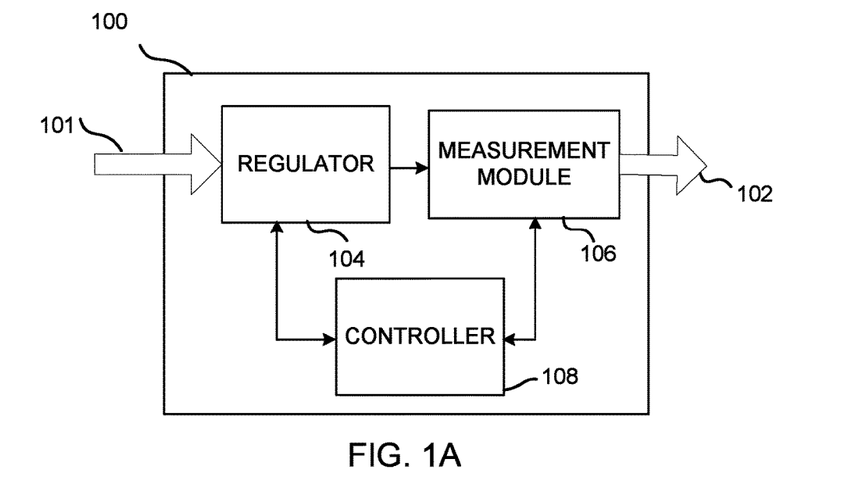
FIG. 1A illustrates a block diagram representation of one embodiment of a device.

FIG. 1A illustrates a schematic representation of a device 100, in accordance with an embodiment. The device 100 comprises an input port 101, an output port 102, a regulator 104, a measurement module 106 and a controller 108. Input port 101 may be configured to receive a Direct Current (DC) voltage and a direct current as input for example from a wall adapter. A regulator 104 may be connected electrically to the input port 101 to receive the input current at the input voltage. The regulator 104 may be controlled by a controller 108, such that the regulator 104 outputs current and voltage to the output port 102 as specified by the controller 108. A measurement module 106 may be configured such that it is able to measure current as output by the regulator 104. The regulator 104 may be any circuit configured to controllably output desired voltage and current. According to an embodiment, the regulator 104 may comprise a linear regulator. According to an embodiment, the regulator 104 may comprise a switched mode regulator. Both the regulator 104 and the measurement module 106 may be in communication with the controller 108. The measurement module 106 may be any circuit or component capable of providing a measure of current output by the regulator 104. As an example, the measurement module 106 may comprise a sense resistor in the output path of regulator 104. The measurement module 106 may comprise resistive, magnetic, capacitive or semiconductor components or a combination thereof to measure the output current from regulator 104.

Referring to FIG. 1A, the controller 108 may be in communication with and control both the regulator 104 and the measurement module 106, capable of causing the regulator 104 to output a specified voltage and a specified current and causing the measurement module 106 to measure output current from regulator 104. The controller 108 may receive measured currents or a measure thereof from measurement module 106. When a load is connected to the output port 102 of the device 100, the controller 108 may cause the regulator 104 to output a voltage on the output port 102, for example, the voltage available at the input port 101. The controller 108 may cause the measurement module 106 to measure the output current from the regulator 104 flowing through the output port 102 to a load (not shown in FIG. 1). The controller 108 may store the value of the measured current and cause the regulator 104 to decrease the output voltage, while maintaining output current. The controller 108 may cause the regulator 104 to lower the output voltage and cause the measurement module 106 to measure the output current again. This measured value of current may be compared with a previously measured and stored value of current. If the output current is found to be lesser than the previously measured current, the controller 108 may cause the regulator 104 to raise the output voltage. If the output current is found to be more than the previously measured current, the controller 108 may cause the regulator 104 to lower the output voltage. If the output current is found to be equal to the previously measured current, the controller 108 may cause the regulator 104 to lower the output voltage or keep it unchanged depending upon previous actions taken by the controller 108. According to an embodiment, the controller 108 may repeat the process described above periodically. According to an embodiment, the controller may repeat the process to successively approximate a lowest output voltage, which supports a measured output current. According to an embodiment, the increments or decrements in output voltage may be based on a successive approximation algorithm.

Figure 1B:
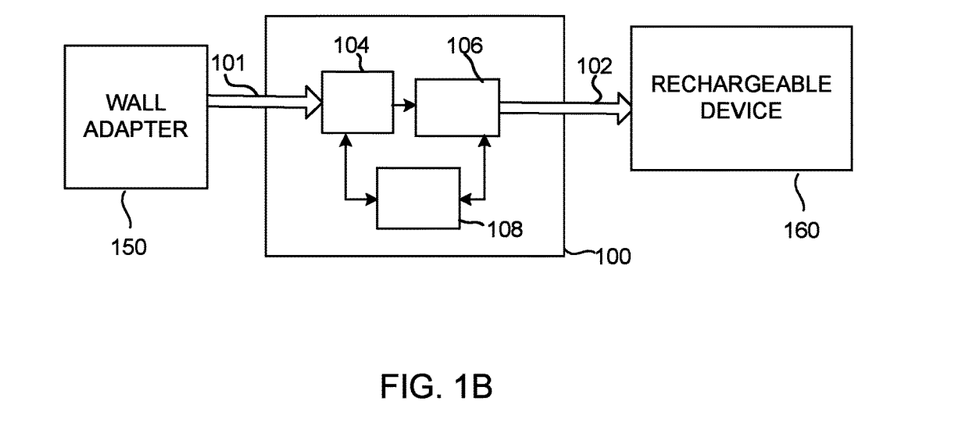
FIG. 1B illustrates an example configuration of one embodiment of the device.

Device 100 may be connected in between a wall adapter 150 and a rechargeable device 160 comprising a charging circuit and a rechargeable battery, for example, a mobile phone or smartphone, as illustrated in FIG. 1B. The charging circuit may be configured to receive a voltage and charge the battery. The charging circuit may provide only a portion of voltage available at its input to the battery, depending upon charging characteristics, for example, charging method followed, maximum charging voltage, charging current drawn by the battery. The charging circuit may drop the excess voltage across a variable resistor, in one embodiment a transistor, causing heat generation and energy loss. The device 100 may reduce heat generation in rechargeable device 160 by reducing the voltage available to the charging circuit. Device 100 may provide only that much voltage to the charging circuit which maintains a desired charging current. The voltage provided by device 100 may be equal to the sum of battery voltage and the voltage loss across the charging circuit when the variable resistor is at its lowest resistance. According to an embodiment, device 100 may be housed in a cable connecting a conventional wall adapter 150 and the rechargeable device 160.

According to an embodiment, controller 108 may comprise a processor and a memory containing instructions, the instructions causing the controller to perform the functions described herein. According to an embodiment, the device 100 may further comprise a low pass filter (not shown in FIGS. 1A and 1B). The low pass filter may block any high frequency components in the output which may occur due to frequent changes in the output voltage and current. In one embodiment the controller 108 is configured to detect a trend in the current consumption, wherein some high frequency variations in the current consumption may be filtered. The portable electric device may comprise internal calibration cycles that are executed occasionally. The controller 108 may detect the calibration cycle and adapt the output voltage accordingly.

Figure 2:
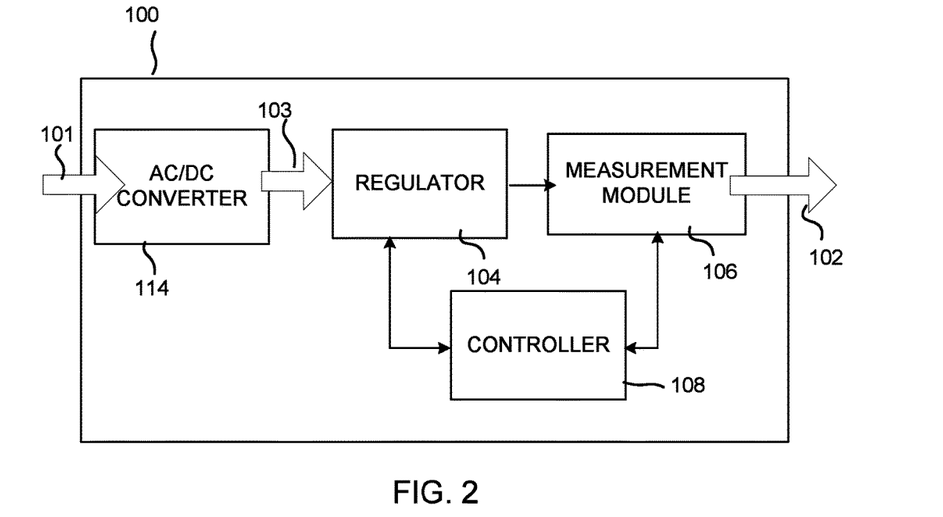
FIG. 2 illustrates a block diagram representation of one embodiment of the device.

FIG. 2 illustrates a schematic representation of a device 100, which comprises a regulator 104, a measurement module 106, a controller 108, and an Alternating-Current to Direct Current (AC/DC) converter 114, in accordance with an embodiment. The regulator 104, the measurement module 106 and the controller 108 may be configured substantially similar to the configuration described in embodiments of FIG. 1, the difference being that the regulator 104 takes input voltage and current from AC/DC converter 114 from output 103 of the AC/DC converter, and the input port 101 may be configured to take Alternating Current (AC) voltage and current as input to the AC/DC converter 114. The AC/DC converter 114 may convert AC to DC and output DC voltage and current at its output port 103, which may act as input to the regulator 104.

Referring to FIG. 2, the AC/DC converter 114 may take AC voltage and current as input, for example, from a wall socket and convert it into a DC voltage and current and provide it to the regulator 104. The controller 108 may be in communication with and control both the regulator 104 and the measurement module 106, capable of causing the regulator 104 to output a specified voltage and a specified current and causing the measurement module 106 to measure output current from the regulator 104. When a load is connected to the output port 102 of the device 100, the controller 108 may cause the regulator 104 to output a high voltage on the output port 102, for example, the voltage available at the output port 103 of the AC/DC converter 114. The controller 108 may cause the measurement module 106 to measure the output current from the regulator 104 flowing through the output port 102 to a load (not shown in FIG. 2). The controller 108 may store the value of the measured current and cause the regulator 104 to decrease the output voltage, while maintaining output current. According to an embodiment, the controller 108 may cause the regulator 104 to lower the output voltage and cause the measurement module to measure the output current again. This measured current may be compared with a previously measured and stored current. If the output current is found to be lesser than the previously measured current, the controller 108 may cause the regulator 104 to raise the output voltage. If the output current is found to be more than or equal to the previously measured current, the controller 108 may cause the regulator 104 to lower the output voltage. According to an embodiment, the controller 108 may repeat the process described above periodically. According to an embodiment, regulator 104 may be part of the AC/DC 104 converter and may be capable of converting AC available, for example at a secondary coil of a transformer, into controlled DC as instructed by controller 108. According to an embodiment, a regulator 104 capable of converting AC into controlled DC as instructed by controller 108 may achieve higher energy efficiency. Further such a configuration may be more compact.

Referring to FIG. 2, the device 100 may be used for example to charge a device comprising a rechargeable battery and a charging circuit. A charging circuit may use a variable resistor, in one embodiment a transistor, to control the charging voltage available to a battery, dropping voltage difference between voltage available at its input and voltage needed by battery across the variable resistor. This may generate heat and heat up the device. According to an embodiment, the device 100 may provide a voltage at the output port 102 to the charging circuit, which is substantially equal to the voltage needed by the battery, consequently reducing or eliminating the need to drop voltage across the variable resistor of charging circuit. The voltage provided to the charging circuit at the output port 102 may be equal to the sum of charging voltage needed by the battery and the lowest possible voltage drop across the charging circuit. The lowest possible drop across charging circuit may include voltage drop across parasitic resistances and the minimum possible voltage drop across the variable resistor. Heating up of a device comprising a rechargeable battery during charging may be reduced, which may improve usability of the device and/or longevity of the device components. Further, charging efficiency and/or charging speed may be improved. For example, Japan Electronics and Information Technology Industries Association (JEITA) provides guidelines for improving battery-charging safety, wherein lower temperature may allow faster charging.

Figure 3:
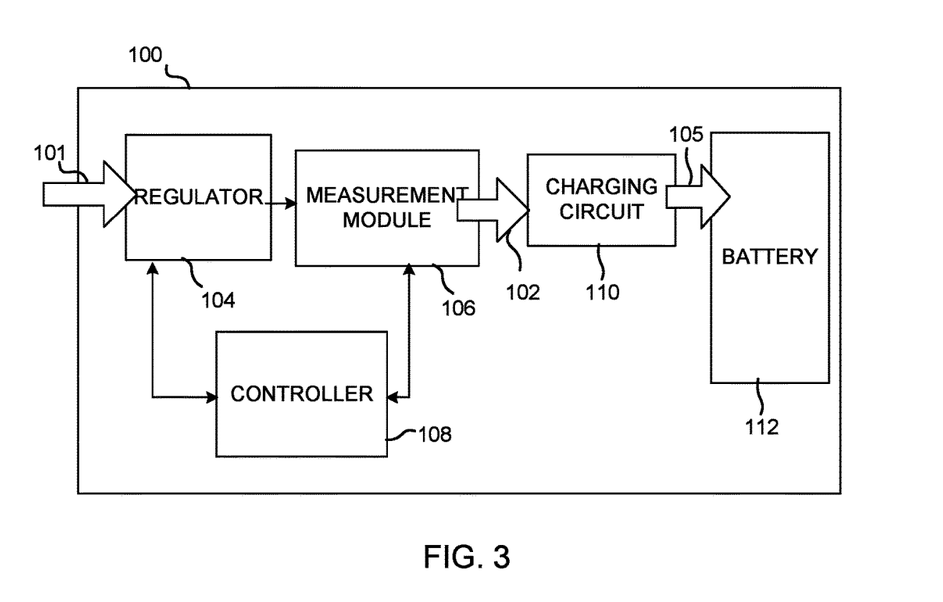
FIG. 3 illustrates a block diagram representation of one embodiment of the device.

FIG. 3 illustrates a device 100 comprising a regulator 104, a measurement module 106, a charging circuit 110, a battery 112, an input port 101 and a controller 108 in accordance with an embodiment. The controller 108, the regulator 104 and the measurement module 106 and the input port 101 may be configured and function substantially similar to embodiments of FIG. 1, with the difference that the output 102 providing regulated voltage and current as specified by the controller 108 is input to the charging circuit 110. The charging circuit 110 may comprise an output port 105 coupled to the battery 112 and configured to provide a charging voltage and current to the battery 112.

Referring to FIG. 3, the device 100 may receive an input DC voltage and current via the input port 101. The regulator 104 may output a voltage and current, specified by the controller 108, over the port 102 to the charging circuit 110. The charging circuit 110 may output a charging voltage and current depending upon the battery 112 voltage and the current drawn by it. The charging circuit 110 may be a conventional charging circuit comprising a linear regulator. The charging circuit 110 may comprise a variable resistance, in one embodiment a transistor, over which the voltage difference between the charging voltage needed by the battery 112 and the voltage available to as input. The controller may cause the regulator 104 to output a voltage, which is substantially equal or slightly greater than the charging voltage needed by the battery 112, allowing for minimal or no voltage drop in the charging circuit 110, consequently reducing or eliminating the heat generated by the charging circuit 110. The voltage provided to the charging circuit 110 at the output port 102 may be equal to the sum of charging voltage needed by the battery 112 and the lowest possible voltage drop across the charging circuit 110. The lowest possible drop across the charging circuit 110 may include voltage drop across parasitic resistances present in the charging circuit 110 and the minimum possible voltage drop across the variable resistor. According to an embodiment, the regulator 104 is a linear regulator and unwanted heat generation may be shifted from sensitive areas of the device 100 to non-sensitive areas. According to an embodiment, regulator the 104 is a switched mode regulator and unwanted heat generation in the device 100 during charging is reduced.

According to an embodiment, the controller 108, the regulator 104 and the measurement module 106 of the embodiments described herein may be integrated in the same package, for example as an Integrated Circuit (IC) with necessary pins or a printed circuit board with the necessary contact points.

Figure 4A:
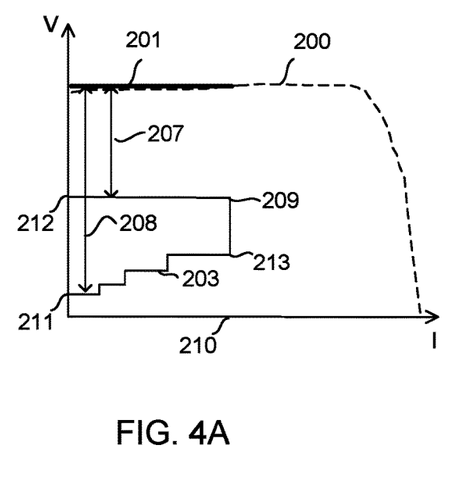
FIG. 4A graphically illustrates the charging characteristics of one embodiment in linear non-collapsible charger.

FIG. 4A illustrates a graphic representation of battery voltage 203, a wall adapter voltage 200, voltage available at input of charging circuit 201 with respect to current in a conventional non-collapsible linear charging solution during a charging cycle which charges a battery to full. A non-collapsible linear charging solution may be able to supply a relatively higher charging current, meeting a battery's maximum charging current limits as opposed to a collapsible linear charging solution wherein the charging current is limited to a value, which may be lower than the battery's maximum charging current.

Referring to FIG. 4A, charging may start at point 211, with a low battery voltage 203 and charging current. As the battery is charged, the battery voltage 203 may increase by steps till point 213 whereat the battery draws maximum charging current 210; voltage rises while the charging current remains same till point 209, afterwards the charging current gradually trails off to zero while battery voltage 203 reaches the maximum battery voltage at 212. Line 200 illustrates the voltage and current available at the output of a conventional non-collapsible charger. Line 201 represents the charging trace followed by such a charger, illustrating the voltage and currents available to a charging circuit, at the output of the charger while charging the battery. There is a wide gap between the voltage available at the input of a charging circuit 201 and the voltage needed by battery 211, especially at the start of charging 211 the voltage gap 208 is large. At the end of charging 212 the voltage gap 207 is still substantial. In a conventional linear charging solution the charging circuit may drop this voltage across a variable resistor, generating unwanted heat.

Figure 4B:
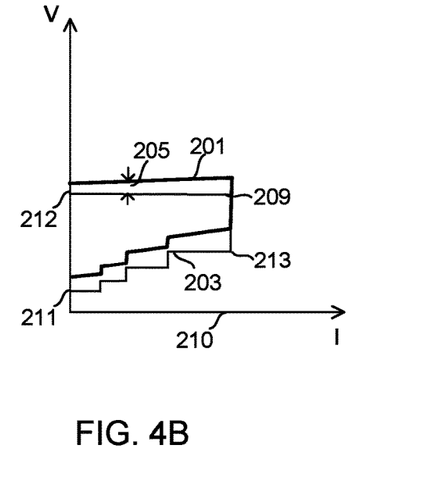
FIG. 4B graphically illustrates charging characteristics according to one embodiment.

FIG. 4B illustrates a graphical representation of charging voltage 203 and input voltage 202 available to a charging circuit in accordance with an embodiment during a charging cycle wherein the battery is charged to full. Line 203 represents the charging voltage and current needed by a battery during a charging cycle. Charging may start at point 211 and end at point 212 with battery/charging voltage and charging current increasing in steps from point 211 to 213 whereat the battery draws the maximum charging current 210 and the battery voltage rises. This continues till point 209, whereat charging current starts to trail off and battery voltage rises to the maximum battery voltage at 212. Line 201 represents the charging trace, the voltage and current available to a charging circuit according to embodiments disclosed herein. The voltage available to charging circuit closely follows the changes in battery voltage and the gap 205 between voltage available to charging circuit at input 201 and battery/charging voltage 202 is quite small throughout the charging cycle from point 211 to 212, as compared to gaps 207 and 208 of FIG. 4A of a conventional non-collapsible linear charging solution. Gap 205 may equal to or substantially equal to sum of voltage drops across parasitic resistances in the charging circuit and minimum possible resistance of a variable resistor conventionally used to drop the voltage. According to an embodiment, the charging trace, voltage and current relationships illustrated in FIG. 4B may be achieved in embodiments of FIG. 1, FIG. 2 and FIG. 3 and/or the embodiments of methods described herein.

Figure 5A:
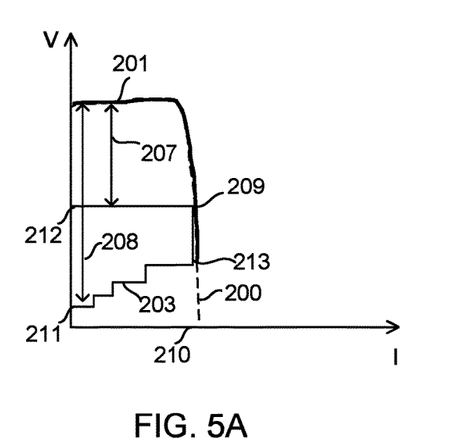
FIG. 5A graphically illustrates the charging characteristics of one embodiment in linear collapsible charger.

FIG. 5A illustrates a graphic representation of battery voltage 203, a wall adapter voltage 200, voltage available at input of charging circuit 201 and with respect to current in a conventional collapsible linear charging solution. A collapsible linear charging solution may be able to supply a maximum charging current which is less than the maximum charging current the battery may draw. When the maximum charging current supported by the collapsible linear charging solution is approached, the voltage available at input of a charging circuit may drop.

Referring again to FIG. 5A, charging may start at point 211, with a low battery voltage 203 and charging current. As the battery is charged, the battery voltage 203 may increase by steps till point 213 whereat the battery draws maximum charging current available 210 the maximum current being limited by the charging solution at a level which may be less than the maximum charging current the battery is able to draw; voltage rises at the same charging current till point 209 afterwards the charging current gradually trails off to zero while battery voltage 203 reaches the maximum battery voltage at 212. In one embodiment, wherein the device comprises a switching regulator, the device may provide higher current at point 213 when the voltage has been lowered. Line 200 illustrates the voltage and current available at the output of a collapsible charger. Line 201 represents the charging trace followed by such a charger, illustrating the voltage and currents available to a charging circuit, at the output of the charger while charging the battery. There is a wide gap between the voltage available at the input of a charging circuit 201 and the voltage needed by battery 211, especially at the start of charging 211 the voltage gap 208 is large. At the end of charging 212 the voltage gap 207 is still substantial. In a linear charging solution the charging circuit may drop this voltage across a variable resistor, generating unwanted heat.

Figure 5B:
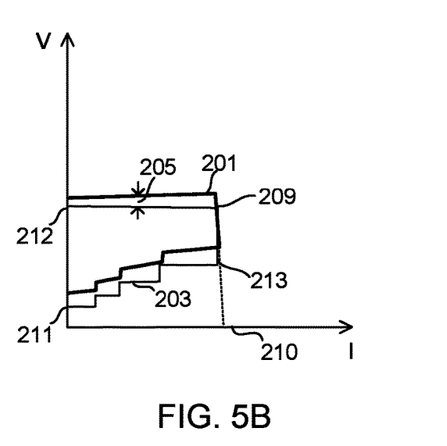
FIG. 5B graphically illustrates charging characteristics according to one embodiments.

FIG. 5B illustrates a graphical representation of charging voltages 203 and input voltage 202 available to a charging circuit in accordance with an embodiment. Line 203 represents the charging voltage and current needed by a battery during a charging cycle. Charging may start at point 211 and end at point 212 with battery/charging voltage and charging current increasing in steps from point 211 to 213 whereat the battery draws the maximum charging current 210 and the battery voltage rises. This continues till point 209, whereat charging current starts to trail off and battery voltage rises to the maximum battery voltage at 212. Line 201 represents the charging trace, the voltage and current available to a charging circuit according to embodiments disclosed herein. As can be seen, the voltage available to charging circuit closely follows the changes in battery voltage and the gap 205 between voltage available to charging circuit at input 201 and battery/charging voltage 202 is quite small throughout the charging cycle from point 211 to 212, as compared to gaps 207 and 208 of FIG. 5A of a conventional collapsible linear charging solution. Gap 205 may be equal or substantially equal to a sum of voltage drops across parasitic resistances in the charging circuit and minimum possible resistance of a variable resistor conventionally used to drop the voltage. According to an embodiment, the charging trace, voltage and current relationships illustrated in FIG. 5B may be achieved in embodiments of FIG. 1, FIG. 2 and FIG. 3 and/or the embodiments of methods described herein.

According to an embodiment, a charging solution may comprise means to charge a rechargeable battery, for example, a wall charger and a charging circuit. A wall adapter may take AC as input and provide a DC output. Charging circuit may take the DC output from wall adapter as input and output a charging voltage to the battery. The charging voltage may be equal to or lesser than the output voltage of wall adapter depending upon the charging requirements and characteristics of the battery.

The functionality described herein can be performed, at least in part, by one or more hardware logic components. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 6:
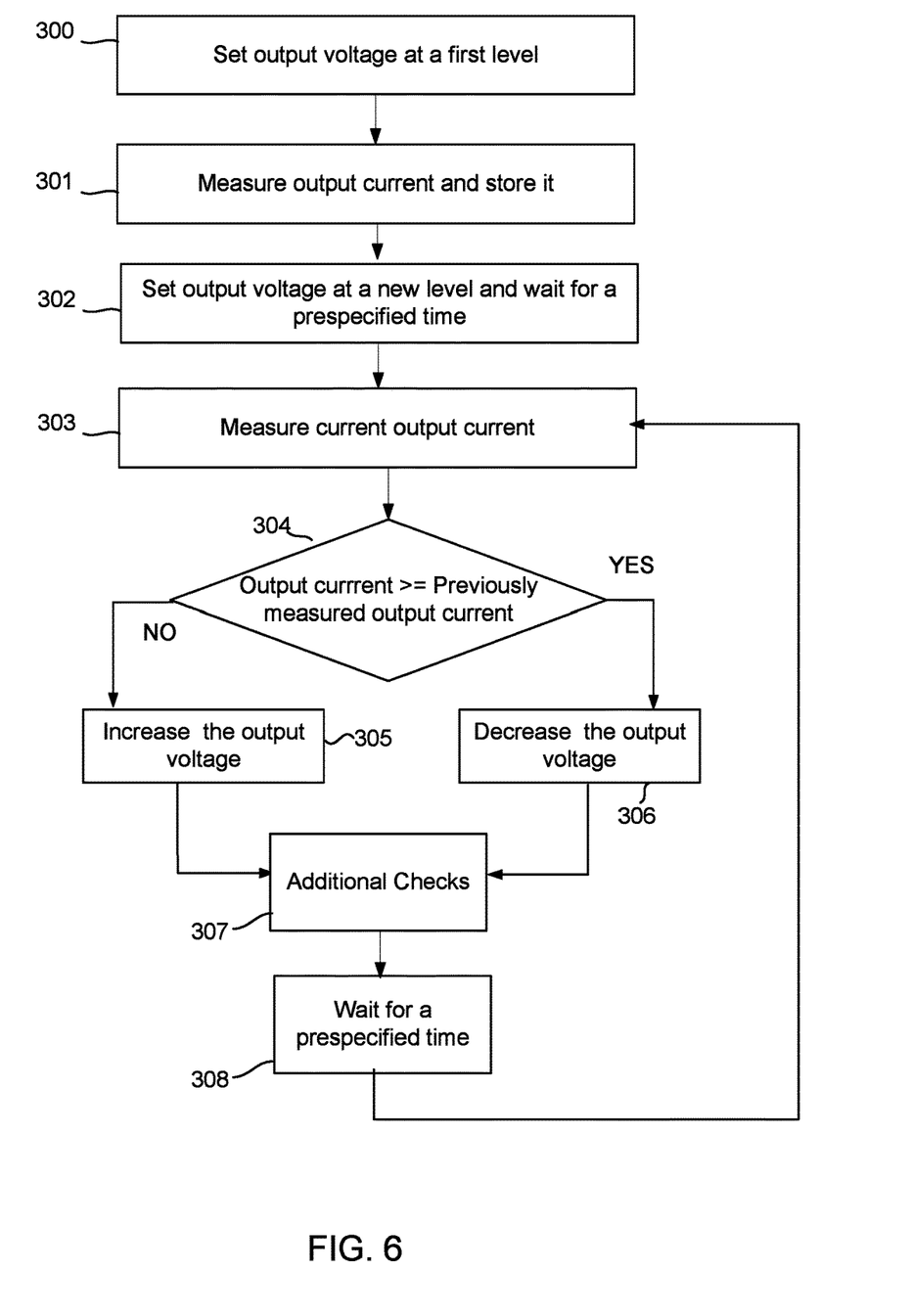
FIG. 6 illustrates a schematic flow chart of a method in accordance with an embodiment.

FIG. 6 illustrates, as a schematic flow chart, a method of providing a charging voltage to a charging circuit in accordance with an embodiment. The schematic flow chart describes one simplified embodiment for iteratively discovering a limit value to the output voltage level having the effect of limiting the charging current. Referring to FIG. 6 the process may comprise operations 300 through 308. According to an embodiment, the process of FIG. 3 may be compiled into the program code stored in a memory and executed by a processor; According to an embodiment, the controller 108 may comprise a memory containing the program code and a processor executing the program code.

Operation 300 may include setting an output voltage at a first level. This output voltage may be available to a charging circuit 110 of a device having a rechargeable battery as input. Operation 300 may further include waiting for a pre-specified time allowing the output current to stabilize.

Operation 301 may include measuring an output current. The output current may be the charging current drawn by the charging circuit 110. The measurement of the output current may be carried out by a measurement module 106. The controller 108 may cause the measurement module 106 to measure the output current and also receive the measured current.

Operation 302 may include setting the output voltage at a new level. According to an embodiment, this new voltage level may be lower than the first level. Operation 302 may further include waiting for a pre-specified time allowing the output current to stabilize.

Operation 303 may include measuring the output current again. The measurement of the output current may be carried out by a measurement module 106. The controller 108 may cause the measurement module 106 to measure the output current and also receive the measured current.

Operation 304 may include comparing the first measured output current with the second measured output current. If the first measured output current is higher than or equal to the second measured output current, operation 305 may be performed. If the first measured output is lower or equal to the second measured output current, operation 306 may be performed. According to an embodiment, comparison of the output currents may take into account the precision and/or accuracy of the measurements, for example, disregarding difference between output currents below a certain threshold.

Operation 305 may include increasing the output voltage. According to an embodiment, output voltage may be increased in steps of 1 mV, 10 m, 100 mV or a combination thereof. According to an embodiment, the output voltage may be increased in increments chosen from a range of 1 to 100 mV. According to an embodiment, the output voltage may be increased in increments based on previous output voltages, output currents and output voltage adjustment increments and decrements. Further operation 305 may include waiting for a pre-specified time allowing the output current to stabilize.

Operation 306 may include decreasing the output voltage. According to an embodiment, output voltage may be decreased in steps of 1 mV, 10 mV, 100 mV or a combination thereof. According to an embodiment, the output voltage may be decreased in steps chosen from a range of 1 to 100 mV. According to an embodiment, the output voltage may be decreased in increments based on previous output voltages, output currents and output voltage adjustment increments and decrements. Operation 306 may further include waiting for a pre-specified time allowing the output current to stabilize.

Operation 307 may follow operations 305 and 306 and may include additional checks to maintain optimal charging parameters. There may be multiple additional checks. According to an embodiment Operation 307 may include intermittently raising the output voltage to determine if the output current increases. This may be done, for example, to verify that output current is not limited below a level which a load may need. According to an embodiment, operation 307 may include comparing the current output voltage with a series of previous output voltages and determining whether the output voltage is switching between two values. According to an embodiment, if output voltage switches between two values, operation 307 may include setting the output voltage at value equal to higher of the two values.

Operation 308 may follow operation 307, it may include waiting for a preset time before repeating the process from operation 303. According to an embodiment, the waiting period may be of the order of milliseconds, tens of milliseconds, hundreds of milliseconds or seconds. According to an embodiment, the waiting period may be adaptive, depending upon multiple factors, including rate of change of output current per cycle of output voltage adjustment, for example, the waiting period may be longer when the output current changes slowly with output voltage adjustment and shorter when the current changes faster with output voltage adjustment.

According to an embodiment, the method may further include comparing the measured output current with an upper threshold and decreasing the output voltage if the measured current is higher than the upper threshold.

According to an embodiment, the method may further include comparing the measured output current with a lower threshold and increasing the output voltage if the measured current is lower than the lower threshold.

According to an embodiment, the process of FIG. 6 may further include operations to adapt to temperature variations, variations in load current due to battery aging, temperature limits, for example Jeita limits, charging algorithms as implemented by a battery charging circuit etc.

According to an embodiment, operations 304, 305, 306 may be carried out in accordance with a successive approximation algorithm to find a minimum output voltage needed for a desired output current as drawn by a battery.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The embodiments illustrated and described herein as well as embodiments not specifically described herein but within the scope of aspects of the disclosure constitute exemplary means to output a voltage and a current in a controllable manner to a charging circuit. For example, the elements illustrated in FIG. 1 to FIG. 3 constitute exemplary means for outputting a desired voltage and current in a controllable manner to a charging circuit, exemplary means for charging a battery and exemplary means of measuring current, exemplary means for converting AC into DC, and exemplary means to make electrical connections.

One aspect discloses a device, comprising: an output port configured to output an output voltage and an output current; a measurement module configured to measure the output current; and a controller configured to: set an output voltage at a first level; receive a first measured output current; set the output voltage at a second level; receive a second measured output current; compare the first measured output current and the second measured output current; increase the output voltage if the second measured output current is less than the first measured output current; and decrease the output voltage if the second measured output current is the same as or greater than the first measured output current. In one embodiment the controller is configured to successively approximate a lowest output voltage needed to support a measured output current. In one embodiment the device comprises a charging circuit comprising an input and an output; and a battery; wherein the input of the charging circuit is coupled to the output port and the output of the charging circuit is configured to charge the battery. In one embodiment the charging circuit comprises a linear regulator. In one embodiment the charging circuit comprises a switched mode regulator. In one embodiment the controller comprises a processor and a memory containing instructions. In one embodiment the controller comprises a hardwired logic circuit. In one embodiment the device comprises a low pass filter at the output port, wherein the low pass filter is configured to filter out a high frequency component of the voltage and current output via the output port. In one embodiment the device comprises a switched mode regulator, wherein the switched mode regulator is configured to be controlled by the controller. In one embodiment the device comprises a linear regulator, wherein the linear regulator is configured to be controlled by the controller.

Alternatively, or in addition to any of the preceding embodiments, a device is disclosed comprising: an output port configured to output an output voltage and an output current; an converter configured to take alternating current as input and provide direct current as output; a measurement module; and a controller configured to: set an output voltage at a first level; receive a first measured output current; set an output voltage at a second level; receive a second measured output current; compare the first measured output current and the second measured output current; increase the output voltage if the second measured output current is less than the first measured output current; and decrease the output voltage if the second measured output current is the same as or greater than the first measured output current. In one embodiment the controller and the measurement module are integrated in a single package. In one embodiment at least a portion of the converter, the controller, the regulator and the measurement module are integrated in a single package. In one embodiment the measurement module comprises a sense resistor. In one embodiment the device comprises a linear regulator, wherein the linear regulator is configured to be controlled by the controller. In one embodiment the device comprises a switched mode regulator, wherein the switched mode regulator is configured to be controlled by the controller.

Alternatively, or in addition to any of the preceding embodiments, a method executed by a controller is disclosed, comprising: setting an output voltage at a first level; receiving a first measured output current; setting the output voltage at a second level; receiving a second measured output current; comparing the second measured output current with the first measured output current; increasing the output voltage if the second measured output current is less than the first measured output current; and decreasing the output voltage if the second measured output current is more than or equal to the first measured output current. In one embodiment the method comprises comparing the second measured output current with a pre-specified threshold output current; and increasing the output voltage if the second measured output current is less than the pre-specified threshold output current. In one embodiment the method comprises comparing the second measured output current with a pre-specified threshold output current; and decreasing the output voltage if the second measured output current is greater than the pre-specified threshold output current. In one embodiment the method comprises waiting for a pre-specified time; receiving a third measured output current; comparing the third measured output current with the second measured output current; increasing the output voltage if the third measured output current is less than the second measured output current; and decreasing the output voltage if the third measured output current is more than or equal to the second measured output current.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
   an input port configured to receive an electrical input having a corresponding input voltage;
   an output port configured to provide an electrical output having an output voltage and an output current;
   a measurement module configured to measure the output current;

and a controller configured to:
set the output voltage at a first level, lower than a level of the input voltage;
receive a first measured output current value from the measurement module, the first measured output current value corresponding to the output voltage set at the first level;
set the output voltage a second level, lower than the first level;
receive a second measured output current value from the measurement module, the second measured output current value corresponding to the output voltage set at the second level;
compare the first measured output current value and the second measured output current value;
increase the output voltage to at least the first level if the second measured output current value is less than the first measured output current value;
decrease the output voltage to at least the second level if the second measured output current value is the same as or greater than the first measured output current value; and
determine, based on a series of previous output voltage levels, if the output voltage is switching back and forth between a higher voltage level and a lower voltage level, and in accordance with a determination that the output voltage is switching back and forth, set the output voltage at the higher voltage level.

2. The device of claim 1, wherein the controller is configured to successively approximate a lowest output voltage level needed to support a measured output current value.

3. The device of claim 1, comprising:
a charging circuit comprising an input and an output; and
a battery;
wherein the input of the charging circuit is coupled to the output port and the output of the charging circuit is configured to charge the battery.

4. The device of claim 1, further comprising a linear regulator or a switched mode regulator configured to set the output voltage to different voltage levels.

5. The device of claim 1, wherein an output voltage level is intermittently increased to determine if an output current value increases, and the controller is further configured to verify that the output current value at the increased output voltage level is not limited below a defined load level.

6. The device of claim 1, wherein the controller comprises a processor and a memory containing instructions.

7. The device of claim 1, wherein the controller comprises a hardwired logic circuit, and the output port is connected to a charging circuit that is connected to a rechargeable battery, and the controller is further configured to compare the second measured output current value to a defined threshold output current and increase an output voltage level if the second measured output current value is less than the defined threshold output current, wherein the defined threshold output current is based on a lowest output voltage level allowing a defined output current value.

8. The device of claim 1, further comprising a low pass filter configured to filter out a frequency component of the electrical output.

9. The device of claim 1, further comprising a switched mode regulator, wherein the switched mode regulator is configured to be controlled by the controller.

10. The device of claim 1, further comprising a linear regulator, wherein the linear regulator is configured to be controlled by the controller.

11. A device comprising:
an input port configured to receive an electrical input having a corresponding input voltage;
an output port configured to provide an electrical output having an output voltage and an output current;
a converter configured to take alternating current as input and provide direct current as the output current;
a measurement module configured to measure the output current;
and a controller configured to:
set the output voltage at a first level, lower than a level of the input voltage;
receive a first measured output current value from the measurement module, the first measured ouput current value corresponding to the ouput voltage set at the first level;
set the output voltage at a second level, lower than the first level;
receive a second measured output current value from the measurement module, the second measured output current value corresponding to the output voltage set at the second level;
compare the first measured output current value and the second measured output current value;
increase the output voltage to at least the first level if the second measured output current value is less than the first measured output current value;
decrease the output voltage to at least the second level if the second measured output current value is the same as or greater than the first measured output current value; and
determine, based on a series of previous output voltage levels if the output voltage is switching back and forth between a higher voltage level and a lower voltage level, and in accordance with a determination that the output voltage is switching back and forth, set the output voltage at the higher voltage level.

12. The device of claim 11, wherein the controller and the measurement module are integrated in a single package.

13. The device of claim 11, wherein at least a portion of the converter, the controller, a regulator and the measurement module are integrated in a single package.

14. The device of claim 11, wherein the measurement module comprises a sense resistor and the output port is connected to a charging circuit that is connected to a rechargeable battery, and the controller is further configured to compare the second measured output current value to a defined threshold output current and increase an output voltage level if the second measured output current value is less than the defined threshold output current, wherein the defined threshold output current is based on a minimum voltage level to maintain a charging current to the rechargeable battery.

15. The device of claim 11, further comprising a linear regulator, wherein the linear regulator is configured to be controlled by the controller.

16. The device of claim 11, further comprising a switched mode regulator, wherein the switched mode regulator is configured to be controlled by the controller.

17. A method executed by a controller, comprising:
receiving, at an input port, an electrical input having a corresponding input voltage;
setting an output voltage at a first level, lower than a level of the input voltage;
receiving a first measured output current value from an output port, the first measured output current value corresponding to the output voltage set at the first level;

setting the output voltage at a second level, lower than the first level;
receiving a second measured output current value from the output port, the second measured output current value corresponding to the output voltage set at the second level;
comparing the second measured output current value with the first measured output current value;
increasing the output voltage to at least the first level if the second measured output current value is less than the first measured output current value;
decreasing the output voltage to at least the second level if the second measured output current value is the same as of greater than the first measured output current value; and
determining, based on a series of previous output voltage levels if the output voltage is switching back and forth between a higher voltage level and a lower voltage level, and in accordance with a determination that the output voltage is switching back and forth, setting the output voltage to the higher voltage level.

18. The method of claim 17, comprising:
comparing the second measured output current value with a defined threshold output current; and
increasing the output voltage if the second measured output current value is less than the defined threshold output current.

19. The method of claim 17, comprising:
comparing the second measured output current value to a defined threshold output current; and
increasing an output voltage level if the second measured output current value is less than the defined threshold output current, wherein the defined threshold output current is based on a sum of a charging voltage for a battery and a lowest voltage drop across a charging circuit connected to the battery.

20. The method of claim 17, comprising:
waiting for a defined time;
receiving a third measured output current value;
comparing the third measured output current value with the second measured output current value;
increasing an output voltage level if the third measured output current value is less than the second measured output current value; and
decreasing the output voltage level if the third measured output current value is greater than or equal to the second measured output current value.

* * * * *